United States Patent
Funato et al.

(10) Patent No.: US 8,587,774 B2
(45) Date of Patent: Nov. 19, 2013

(54) VELOCITY DETECTING DEVICE AND MULTI-COLOR IMAGE FORMING APPARATUS

(75) Inventors: Hiroyoshi Funato, Kanagawa (JP); Shigeaki Imai, Kanagawa (JP); Koji Masuda, Kanagawa (JP); Hidemasa Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 748 days.

(21) Appl. No.: 12/696,216

(22) Filed: Jan. 29, 2010

(65) Prior Publication Data
US 2010/0310284 A1 Dec. 9, 2010

(30) Foreign Application Priority Data

Jun. 9, 2009 (JP) .................... 2009-137902

(51) Int. Cl.
*G01C 3/08* (2006.01)
(52) U.S. Cl.
USPC .......................................................... 356/28
(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | |
|---|---|---|---|
| 6,686,946 B2 | 2/2004 | Masuda et al. | |
| 6,717,606 B2 | 4/2004 | Masuda | |
| 6,724,414 B2 | 4/2004 | Masuda et al. | |
| 6,813,051 B2 | 11/2004 | Suzuki et al. | |
| 7,068,295 B2 | 6/2006 | Masuda | |
| 7,277,212 B2 | 10/2007 | Miyatake et al. | |
| 7,355,770 B2 | 4/2008 | Miyatake et al. | |
| 7,382,386 B2 | 6/2008 | Matsuzaki et al. | |
| 7,450,283 B2 | 11/2008 | Masuda | |
| 7,564,607 B2 | 7/2009 | Imai | |
| 7,593,150 B2 | 9/2009 | Masuda | |
| 7,619,795 B2 | 11/2009 | Masuda | |
| 7,619,796 B2 | 11/2009 | Imai | |
| 8,032,061 B2 | 10/2011 | Park et al. | |
| 8,264,733 B2 | 9/2012 | Hanashi et al. | |
| 2004/0213133 A1 | 10/2004 | Funato et al. | |

(Continued)

FOREIGN PATENT DOCUMENTS

CN 1249420 A 4/2000
CN 101211138 A 7/2008

(Continued)

OTHER PUBLICATIONS

Japanese Office Action 2009-137902 dated Jul. 2, 2013.

*Primary Examiner* — Luke Ratcliffe
(74) *Attorney, Agent, or Firm* — Dickstein Shapiro LLP

(57) ABSTRACT

A velocity detecting device includes an image-pattern acquiring unit that includes a laser light source and an area sensor that acquires a one-dimensional or a two-dimensional image. The image-pattern acquiring unit includes a lens between a moving member and the area sensor, irradiates a beam emitted from the laser light source to the moving member to make a scattering light of the moving member scattered from the moving member on the area sensor by using the lens, and acquires an image pattern at a predetermined time interval in association with movement of the moving member. A velocity calculating unit calculates the velocity of the moving member by computing the image pattern acquired by the image-pattern acquiring unit. The lens is a reduced optical system that projects a reduced object onto the area sensor.

20 Claims, 8 Drawing Sheets

(56) References Cited

U.S. PATENT DOCUMENTS

| | | |
|---|---|---|
| 2004/0240000 A1 | 12/2004 | Miyatake et al. |
| 2005/0067944 A1 | 3/2005 | Masuda et al. |
| 2005/0093963 A1 | 5/2005 | Masuda |
| 2005/0190420 A1 | 9/2005 | Imai et al. |
| 2006/0158711 A1 | 7/2006 | Imai et al. |
| 2007/0058255 A1 | 3/2007 | Imai et al. |
| 2007/0146473 A1 | 6/2007 | Masuda |
| 2007/0165208 A1* | 7/2007 | Cowburn et al. .................. 356/71 |
| 2007/0171425 A1* | 7/2007 | De Groot et al. ............. 356/478 |
| 2007/0236557 A1 | 10/2007 | Imai et al. |
| 2008/0019255 A1 | 1/2008 | Imai et al. |
| 2008/0068678 A1 | 3/2008 | Suzuki et al. |
| 2008/0084594 A1 | 4/2008 | Masuda |
| 2008/0170283 A1 | 7/2008 | Imai |
| 2008/0192323 A1 | 8/2008 | Nakamura et al. |
| 2008/0259426 A1 | 10/2008 | Imai |
| 2008/0297870 A1 | 12/2008 | Kobayashi et al. |
| 2009/0015896 A1 | 1/2009 | Masuda |
| 2009/0058979 A1 | 3/2009 | Saisho et al. |
| 2009/0073529 A1 | 3/2009 | Imai |
| 2009/0074437 A1 | 3/2009 | Tanabe et al. |
| 2009/0225385 A1 | 9/2009 | Imai |
| 2009/0238590 A1 | 9/2009 | Masuda |
| 2010/0008686 A1 | 1/2010 | Masuda et al. |

FOREIGN PATENT DOCUMENTS

| | | |
|---|---|---|
| JP | 8-14824 A | 1/1996 |
| JP | 10-38901 A | 2/1998 |
| JP | 11-316506 A | 11/1999 |
| JP | 2003-266828 A | 9/2003 |
| JP | 2006-227420 A | 8/2006 |
| JP | 2007-198979 A | 8/2007 |
| JP | 2007-279523 A | 10/2007 |
| JP | 2007-283721 A | 11/2007 |
| JP | 2008-65743 A | 3/2008 |
| WO | WO 2005/059629 A1 | 6/2005 |
| WO | WO 2009/008814 A1 | 1/2009 |

* cited by examiner

BEFORE MOVED

MOVED TO RIGHT BY 100 μm

AFTER CROSS-CORRELATION COMPUTATION

AFTER PHASE-ONLY CORRELATION COMPUTATION

VELOCITY DETECTING DEVICE AND MULTI-COLOR IMAGE FORMING APPARATUS

CROSS-REFERENCE TO RELATED APPLICATIONS

The present document incorporates by reference the entire contents of Japanese priority Patent Application No. 2009-137902 filed in Japan on Jun. 9, 2009. The present document incorporates by reference the entire contents of Japanese Application No. 2008-199273 filed in Japan on Aug. 1, 2008.

BACKGROUND OF THE INVENTION

1. Field of the Invention

The present invention relates to a multi-color image forming apparatus for use in a digital copier, a laser printer, a laser plotter, a laser facsimile, or in a multifunction product of these units, and more particularly, to a velocity detecting device that detects velocity of an intermediate transfer belt or of a conveyor belt, and a multi-color image forming apparatus, provided with the velocity detecting device, which employs an intermediate transfer system or a direct transfer system.

2. Description of the Related Art

In recent color image forming apparatuses, to meet a request for an increase in their speed, a so-called a tandem system in which photosensitive elements (image carriers) corresponding to toners of four colors (black, cyan, magenta, and yellow) are arranged in parallel is being adopted as a mainstream system. The tandem system requires to finally superimpose toner images of the colors developed on the photosensitive elements on one another on a recording medium such as a paper (e.g., formed paper, post card, cardboard, and OHP sheet). As a system of the superimposition, there are two systems: a direct transfer system of directly superimposing the toner images on the recording medium, and an intermediate transfer belt system of using an intermediate transfer belt to superimpose the toner images of the colors on one another on the intermediate transfer belt and collectively transfer the toner images to the recording medium. If the conveyor belt for feeding the recording medium such as a paper in the direct transfer system and the intermediate transfer belt in the intermediate transfer belt system are not driven with high accuracy, color misregistration will occur.

To drive the intermediate transfer belt with high accuracy, as described in, for example, Japanese Patent Application Laid-open No. 2008-65743, there is known a method of directly forming a mark on the belt, detecting velocity fluctuation of the belt by reading the mark, and feeding back the detected fluctuation to a drive motor, to achieve high-accuracy driving.

However, in the conventional technology described in the Japanese Patent Application Laid-open No. 2008-65743, because the direct formation of the mark on the intermediate transfer belt requires quite a lot of time and effort, productivity is low, and this causes a large cost increase.

Japanese Patent Application Laid-open No. 2003-266828 discloses an implementation example for conveying a paper with high accuracy by detecting a laser speckle from an object to be observed by a two-dimensional image sensor and controlling the drive.

However, the conventional technology described in the Japanese Patent Application Laid-open No, 2003-266828 does not describe an optical system and does not also describe a method of correcting a detection error.

Japanese Patent Application Laid-open No. 2007-283721 discloses an image forming apparatus that calculates a moving velocity of a photosensitive drum from a speckle pattern produced in a reflected light of a laser light irradiated to the photosensitive drum and controls a rotating velocity of the photosensitive drum.

However, the conventional technology described in the Japanese Patent Application Laid-open No. 2007-283721 does not describe a detailed optical system and does not also describe a method of correcting a detection error. Further, the detection is limited to the detection of the photosensitive drum because of the image forming apparatus.

Japanese Patent Kohyo Publication No. 2007-519944 specifies a relationship between each size of a bright patch and a dark patch of a speckle pattern and a size of a pixel of a photodetector, related to a method of generating a cipher for information security, or a cipher which cannot be physically reproduced, by not a number-theoretic algorithm but from a signal indicating detection of light/dark by the photodetector in which a laser light is irradiated to a light-scattering object and a speckle pattern produced thereby is converted to the pixel.

However, the conventional technology described in the Japanese Patent Kohyo Publication No. 2007-519944 provides a detection condition optimized for generating a cipher signal by a speckle pattern, which is different in the purpose from an optimal detection condition for detecting a velocity of a moving object by the speckle pattern described in the present application, and the detection condition cannot easily be analogized.

SUMMARY OF THE INVENTION

It is an object of the present invention to at least partially solve the problems in the conventional technology.

According to an aspect of the present invention, there is provided a velocity detecting device that detects velocity and velocity fluctuation of a moving member, the velocity detecting device including: an image-pattern acquiring unit that includes a laser light source and an area sensor that acquires a one-dimensional or a two-dimensional image, provides a lens between the moving member and the area sensor, irradiates a beam emitted from the laser light source to the moving member to make a scattering light of the moving member scattered from the moving member, and acquires an image pattern on the area sensor derived from the scattering light by using the lens at a predetermined time interval in association with movement of the moving member; and a velocity calculating unit that calculates velocity of the moving member by computing a plurality of the image patterns acquired by the image-pattern acquiring unit, wherein the lens is a reduced optical system that projects a reduced object onto the area sensor.

According to another aspect of the present invention, there is provided a velocity detecting device that detects velocity and velocity fluctuation of a moving member, the velocity detecting device including: an image-pattern acquiring unit that includes a laser light source and an area sensor that can acquire a one-dimensional or a two-dimensional image, provides a lens between the moving member and the area sensor, irradiates a beam emitted from the laser light source to the moving member to make a scattering light of the moving member scattered from the moving member, and acquires an image pattern on the area sensor derived from the scattering light by using the lens at a predetermined time interval in association with movement of the moving member; and a storage unit that previously stores therein image patterns corresponding to a plurality of positions on the moving member, wherein the moving member is an endless moving member, and the velocity of the moving member is detected by computing the image pattern stored in the storage unit and the image pattern acquired by the image-pattern acquiring unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A configuration, operation, and effect of the present invention are explained in detail below with reference to the accompanying drawings.

First, a basic configuration example of a multi-color image forming apparatus is explained below.

Figure 1:
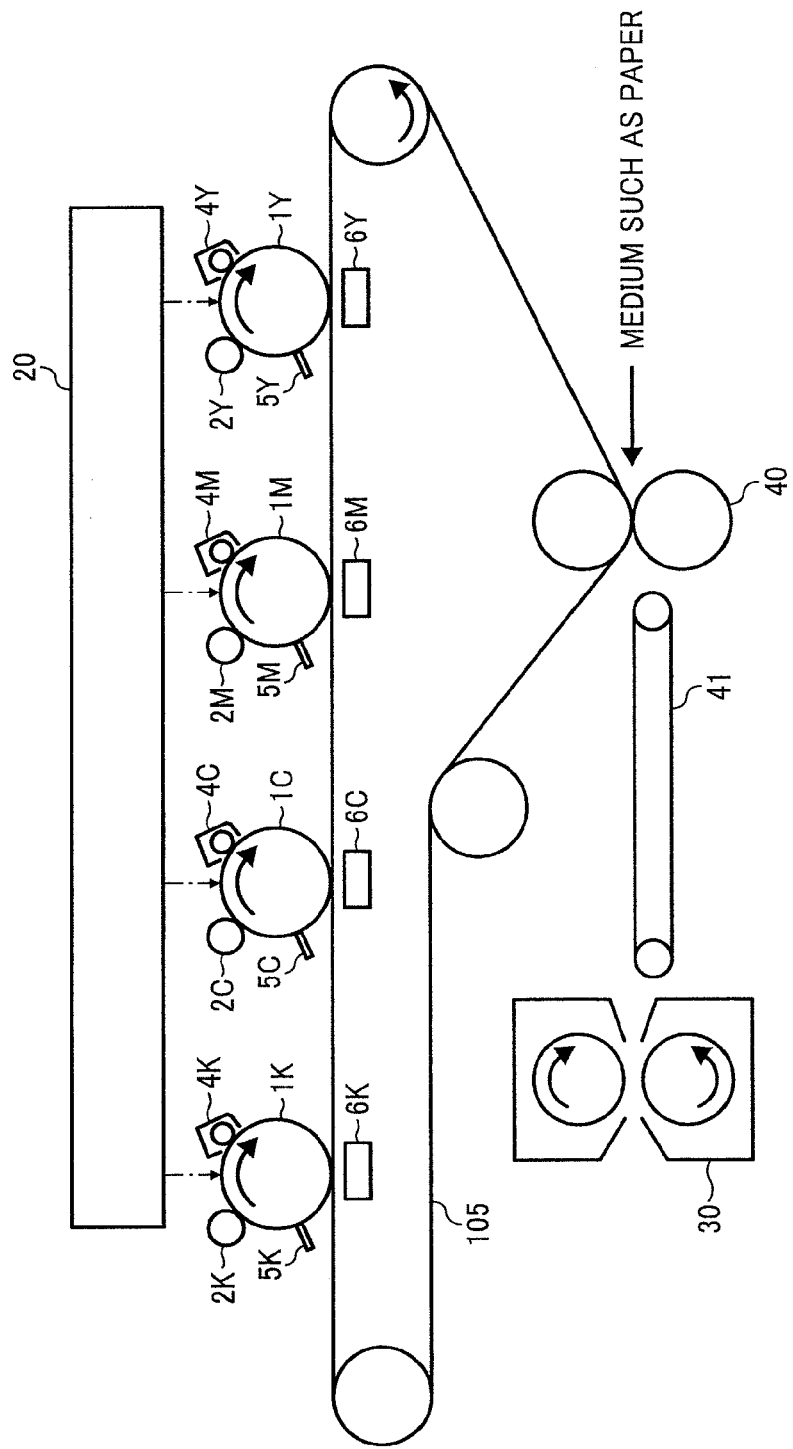
FIG. 1 is a schematic configuration diagram of a multi-color image forming apparatus employing an intermediate transfer system according to one embodiment of the present invention.

FIG. 1 represents the basic configuration example of a multi-color image forming apparatus according to the present invention. Reference numerals 1Y, 1M, 1C, and 1K in the figure are image carriers arranged in parallel along an intermediate transfer belt 105, and the image carriers are drum-shaped photosensitive elements. Each of the photosensitive drums 1Y, 1M, 1C, and 1K is made to rotate in an arrow direction of FIG. 1. Arranged around the photosensitive drums 1Y, 1M, 1C, and 1K are chargers 2Y, 2M, 2C, and 2K being charging units (although the figure shows contact type chargers using charging rollers, any other type such as a charging brush and a non-contact type corona charger can be used), developer units 4Y, 4M, 4C, and 4K of the respective colors being developing units, primary transfer units (e.g., transfer charger, transfer roller, and transfer brush) 6Y, 6M, 6C, and 6K, and photosensitive-element cleaning units 5Y, 5M, 5C, and 5K respectively. Reference numeral 30 in FIG. 1 represents a fixing unit, 40 a secondary transfer unit, and 41 a conveying unit.

The photosensitive drums 1Y, 1M, 1C, and 1K are uniformly charged by the chargers 2Y, 2M, 2C, and 2K, respectively, and thereafter, are exposed by light beams (e.g., laser beams) each of which intensity is modulated according to image information by an optical scanning device 20 being a latent-image forming unit, and electrostatic latent images are thereby formed respectively. A basic configuration of the optical scanning device 20 that performs the exposing step will be explained later.

The electrostatic latent images formed on the photosensitive drums 1Y, 1M, 1C, and 1K are developed by the developer unit 4Y for yellow (Y), the developer unit 4M for magenta (M), the developer unit 4C for cyan (C), and the developer unit 4K for black (K), to be visualized as toner images of yellow (Y), magenta (M), cyan (C), and black (K), respectively.

FIG. 1 represents the multi-color image forming apparatus using the intermediate transfer belt system, and the toner images visualized at the developing step on the photosensitive drums 1Y, 1M, 1C, and 1K are primarily transferred to the intermediate transfer belt 105 by being sequentially superimposed on one another. The toner images of the respective colors superimposed on one another on the intermediate transfer belt 105 are secondarily and collectively transferred to a recording medium such as a paper conveyed to a position of the secondary transfer unit 40 by being fed from a paper feeding unit (not shown) and passed through a conveying unit (not shown). The recording medium with the toner images transferred thereto is conveyed to the fixing unit 30 by the conveying unit 41 such as a conveyor belt and the toner images are fixed by the fixing unit 30 on the recording medium, to obtain a multi-color image or a full-color image. The recording medium after the toner images are fixed thereon is ejected to a paper ejecting unit (not shown) or to a post-processing unit (not shown).

Moreover, the photosensitive drums 1Y, 1M, 1C, and 1K after the toner images are transferred are cleaned by each cleaning member (e.g., blade, brush) of the cleaning units 5Y, 5M, 5C, and 5K respectively, so that each residual toner is removed therefrom. The intermediate transfer belt 105 after the toner images are transferred is also cleaned by a belt cleaning unit (not shown), so that residual toner is removed therefrom.

It should be noted that the multi-color image forming apparatus shown in FIG. 1 has a monochrome mode for forming an image of any single color among the yellow (Y), magenta (M), cyan (C), and black (K), a two-color mode for forming an image by superimposing images of any two colors among the yellow (Y), magenta (M), cyan (C), and black (K) on each other, a three-color mode for forming an image by superimposing images of any three colors of the yellow (Y), magenta (M), cyan (C), and black (K) on one another, and a full-color mode for forming a four-color superimposed image in the above manner. Any one of the modes is specified and executed through an operation unit (not shown), so that a monochrome, a multi-color, or a full-color image can be formed.

The multi-color image forming apparatus with the configuration shown in FIG. 1 is the one using the intermediate transfer system configured to use the intermediate transfer belt 105, primarily transfer the images of the respective colors from the photosensitive drums 1Y, 1M, 1C, and 1K to the intermediate transfer belt 105 to form a four-color superimposed image, and collectively and secondarily transfer the image from the intermediate transfer belt 105 to the recording medium such as a paper. However, like a multi-color image forming apparatus having the configuration shown in FIG. 2, there may be used a multi-color image forming apparatus employing a system of using a conveyor belt 106, instead of the intermediate transfer belt, for carrying and conveying a recording medium such as a paper and directly transferring images from the photosensitive drums 1Y, 1M, 1C, and 1K to the recording medium such as the paper. The multi-color image forming apparatus using the direct transfer system, as shown in FIG. 2, is configured so that an entry path of the recording medium such as the paper is different from that of FIG. 1 and the recording medium is conveyed toward the photosensitive drums 1Y, 1M, 1C, and 1K by the conveyor belt 106.

Figure 2:
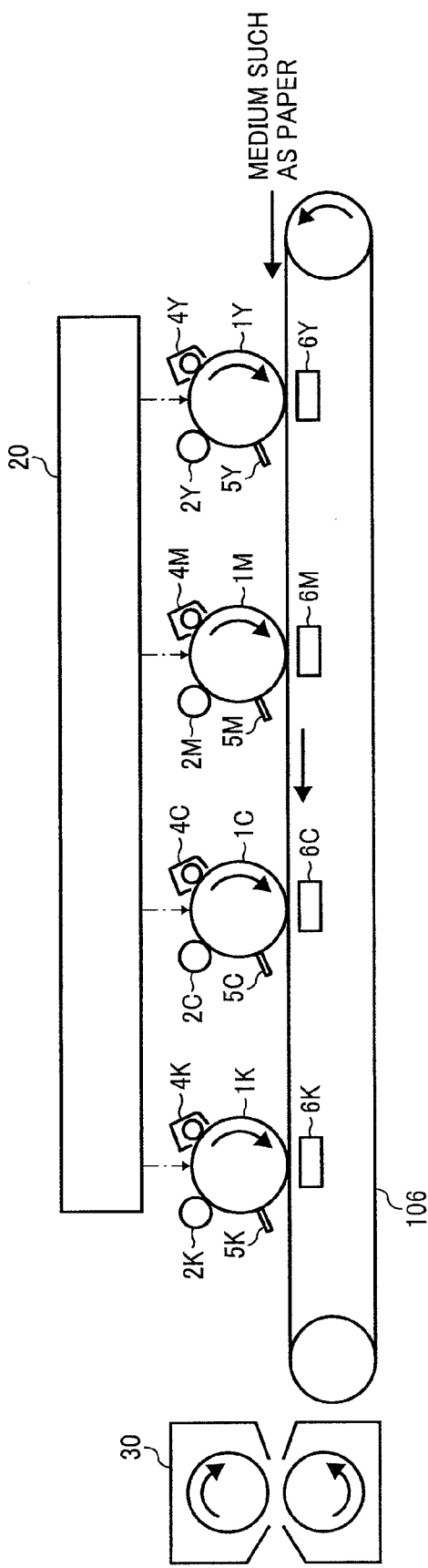
FIG. 2 is a schematic configuration diagram of a multi-color image forming apparatus employing a direct transfer system according to another embodiment of the present invention.

Similarly to the above, in the multi-color image forming apparatus shown in FIG. 2, the photosensitive drums 1Y, 1M, 1C, and 1K are also uniformly charged by the chargers 2Y, 2M, 2C, and 2K, respectively, and thereafter, are exposed by light beams (e.g., laser beams) each of which intensity is modulated according to image information by the optical scanning device 20 being the latent-image forming unit, and electrostatic latent images are thereby formed respectively. The electrostatic latent images formed on the photosensitive drums 1Y, 1M, 1C, and 1K are developed by the developer unit 4Y for yellow (Y), the developer unit 4M for magenta (M), the developer unit 4C for cyan (C), and the developer unit 4K for black (K), to be visualized as toner images of yellow (Y), magenta (M), cyan (C), and black (K), respectively. A recording medium such as a paper is fed from a paper feeding unit (not shown) by synchronizing the timing with this developing step, is conveyed to the conveyor belt 106 via a conveying unit (not shown), and is carried on the conveyor belt 106. The recording medium carried on the conveyor belt 106 is conveyed toward the photosensitive drums 1Y, 1M, 1C, and 1K, and toner images visualized at the developing step on the photosensitive drums 1Y, 1M, 1C, and 1K are transferred to the recording medium by the transfer units 6Y, 6M, 6C, and 6K by being sequentially superimposed on each other. The four-color superimposed toner image transferred to the recording medium is conveyed to the fixing unit 30, where the toner image is fixed on the recording medium, to obtain a multi-color or a full-color image. The recording medium after the toner image is fixed thereon is ejected to a paper ejecting unit (not shown) or to a post-processing unit (not shown).

Moreover, the photosensitive drums 1Y, 1M, 1C, and 1K after the toner images are transferred are cleaned by each cleaning member (e.g., blade, brush) of the cleaning units 5Y, 5M, 5C, and 5K respectively, so that each residual toner is removed therefrom.

Here, in the multi-color image forming apparatuses having the configurations as shown in FIG. 1 and FIG. 2, if the intermediate transfer belt 105 when the intermediate transfer system is used and the conveyor belt 106 when the direct transfer system is used are not driven with high accuracy, color misregistration will occur. To drive the belt with high accuracy, there is also considered a method of manufacturing all the components with high accuracy, however, it is practically difficult to implement the method in terms of a number of components and cost.

Therefore, it is preferable to provide a detector for detecting velocity fluctuation of the belt and feed the result of detection back to a drive motor of the belt. Thus, the velocity detecting device for detecting velocity fluctuation of the belt becomes important.

To detect the velocity fluctuation of the belt, conventionally, the mark is directly formed on the belt. However, because it is difficult to directly process the belt and it therefore takes a long time for the process, the productivity is low, which causes a cost increase.

Therefore, the present invention provides the method and apparatus for detecting velocity fluctuation of a moving member such as a belt in a simple manner without direct process of the belt.

Specific implementation examples are explained below.

Implementation Examples

Figure 3:
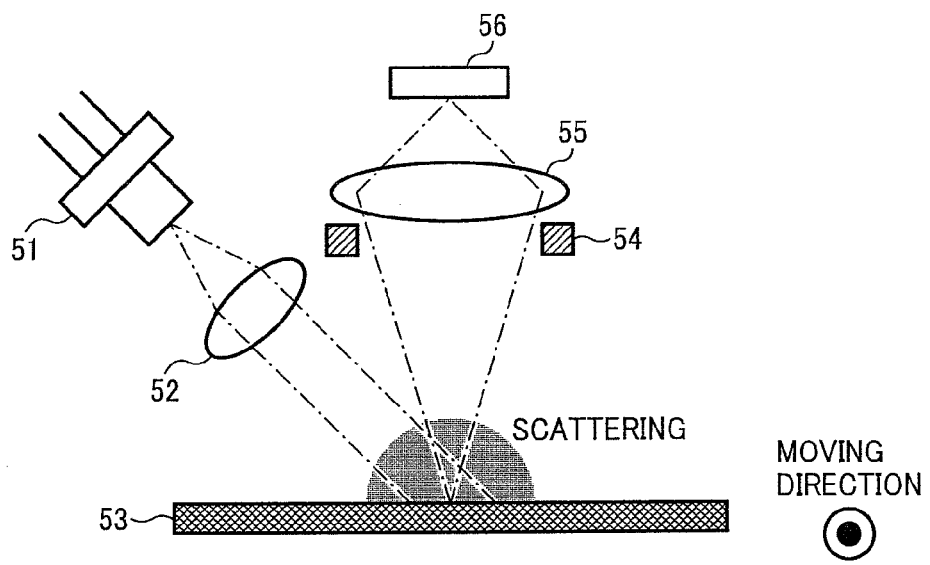
FIG. 3 is a schematic configuration diagram of a velocity detecting device representing one implementation example of the present invention.

A basic configuration example of the velocity detecting device according to the present invention is shown in FIG. 3. The velocity detecting device detects velocity and velocity fluctuation of a moving member (an endless belt-like member such as an intermediate transfer belt and a conveyor belt, or a drum-like member) 53, and includes a laser light source 51 for emitting a laser light (laser beam), a collimate lens 52 for forming the laser light emitted from the laser light source 51 into nearly parallel light, an area sensor 56 that can acquire a one-dimensional or a two-dimensional image, and a lens 55 and an aperture 54 which are provided between the moving member 53 and the area sensor 56.

Figure 4:
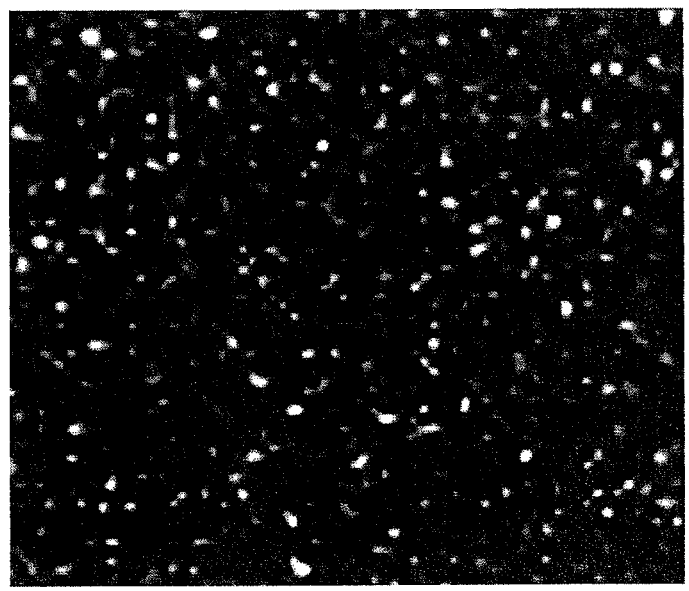
FIG. 4 is a schematic representing one example of a speckle pattern when a laser light is irradiated to a belt-like member.

The laser light emitted from the laser light source 51 and formed into the nearly parallel light by the collimate lens 52 is obliquely irradiated to the moving member 53, and the moving member 53 is photographed by the one-dimensional or the two-dimensional area sensor 56 from the direction perpendicular to a moving plane of the moving member 53. The moving member 53 is a belt-like member having scattering capability on the surface or the inside thereof. The laser light is irradiated to the moving member 53, and a random image pattern called "speckle" as shown in FIG. 4 is thereby obtained.

The speckle pattern is a pattern corresponding to irregularities formed on the surface of the moving member 53 or on the interior portion thereof, and is formed by random interference of the laser light. Therefore, when the moving member 53 moves, then the speckle pattern also moves. As a characteristic of the speckle pattern, the speckle pattern is not lost even if the photographing position changes a little with respect to a traveling direction of the light, and thus it is possible to extremely stably obtain an image pattern corresponding to the irregularities formed on the surface of the moving member 53 or on the interior portion thereof. Because of this, there is generally no need to provide the lens between the area sensor 56 and the moving member 53. However, when the moving member 53 is inclined with respect to the moving plane due to some sort of disturbance, the speckle pattern thereby changes on the area sensor 56, and a detection error occurs when the change in velocity explained later is detected.

Therefore, to avoid the problem, it is preferred to provide at least one lens 55 having positive power between the area sensor 56 and the moving member 53. A plurality of lenses 55 may also be provided as a lens system. By providing the lens 55 having the positive power in this manner, even if the moving member 53 is inclined with respect to the moving plane, the change in the speckle pattern on the area sensor 56 can be reduced, and a detection error of the velocity can be suppressed to a low level.

It is most desirable that the area sensor 56 and the moving member 53 are conjugated with each other, and the detection error of the velocity is thereby reduced. However, a conjugate relationship is not necessarily formed between the two, and thus, even if the two are out of the conjugate relation, there is an effect of reduction in the amount of change in the speckle pattern due to inclination of the moving member 53. Therefore, if the inclination produced in the moving member 53 is not so large, even if the two are out of the conjugate relation, it is possible to suppress the detection error of the velocity to a practically sufficient level.

Moreover, the lens 55 is preferably set as a reduced optical system which reduces an object and projects the reduced object onto the area sensor 56. Thus, a wide range on the moving member can be reduced on the area sensor, which allows downsizing of the area sensor 56. In addition, by using the reduced optical system, even if the moving velocity of the moving member 53 is high, the moving velocity of the speckle pattern on the area sensor becomes low. If the moving velocity is low, a time interval can be prolonged after the speckle pattern is obtained, and as a result, it can take more time for the computing process or the like. This allows reduction of the load of the electronic circuit, reduction of the processing speed of the electronic circuit, and achievement of cost reduction and low power consumption.

The area sensor 56, as shown in FIG. 3, is preferably provided in a direction perpendicular to within the plane where the moving member 53 moves. By providing it in the above manner, even if the moving member shifts in a direction perpendicular to the moving plane by some causes, the speckle pattern on the area sensor is hardly displaced in the planar direction of the area sensor 56, and thus an error is difficult to occur in the detection of the velocity. If the area sensor 56 is obliquely arranged with respect to the moving plane, the speckle pattern on the area sensor is displaced with respect to the planar direction of the area sensor 56 even when the moving member 53 shifts in the direction perpendicular to the moving plane, which may cause a detection error. Consequently, by providing the area sensor 56 in the direction perpendicular to the moving plane, disturbance-resistant and stable detection of the velocity becomes possible.

When the lens 55 is used in the manner as shown in FIG. 3, the size of the speckle on the area sensor is dependent on a numerical aperture (NA) on the image side. Therefore, by providing the aperture 54 near the lens 55 and changing the size of the aperture 54, the size of the speckle is changed. By reducing the aperture 54, the speckle becomes rough, while by increasing the size of the aperture 54, the speckle becomes small. If the size of the speckle is smaller than the pixel pitch of the area sensor 56, the detection error may increase, while if the size is too larger than the pixel pitch, the speckles existing on the area sensor becomes less, which may cause the detection error to increase. As explained above, the size of the speckle needs to be determined appropriately for the pixel pitch of the area sensor 56 to be used. Therefore, it is better to provide the aperture 54 between the moving member 53 and the area sensor 56 and to appropriately set the size of the speckle. It should be noted that as the location in which the aperture 54 is provided, a location near the lens 55 is most desirable, but it may be any location other than that.

Here, the size of the speckle pattern will, be further explained.

Figure 9:
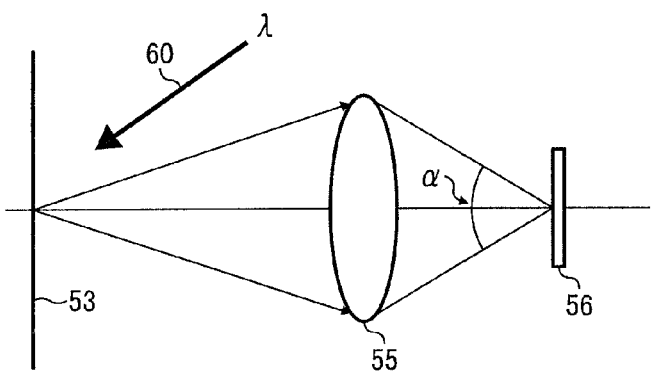
FIG. 9 is a schematic representing a state in which an image of the moving member illuminated by an illuminating light is formed on the area sensor by using a lens.

FIG. 9 is a schematic representing a state in which an image of the moving member 53 illuminated by an illuminating light is formed on the area sensor by using the lens 55. As shown in FIG. 9, a minimum diameter d of the speckle on an imaging plane, when the lens 55 is used to form the image of the moving member 53 on the area sensor 56, is given by $$d = \lambda/\alpha \quad (1)$$

where $\lambda$ is a wavelength of an illuminating light 60 and $\alpha$ is a converging angle of the lens effecting image formation.

The minimum diameter d is also given by $$d = (1+M)\lambda F \quad (2)$$

where M is an image-forming magnification and F is an aperture ratio based on the aperture.

As explained above, the minimum speckle diameter on the imaging plane due to the lens 55 is uniquely determined by an image-forming magnification, a wavelength, and an F value.

Here, which size of the minimum speckle diameter is preferably set with respect to the pixel pitch of the area sensor 56 is explained below.

First, if the minimum speckle diameter is smaller than the pixel pitch of the area sensor 56, then the minimum speckle diameter needs to be larger than one-half of the pixel pitch of the area sensor 56. The reason is derived from restriction such that at least two or more speckles will not be produced with respect to one pixel of the area sensor 56. The speckle has a role of a virtual mark impressed on the moving member 53 as an object, and a movement of the speckle pattern being the impressed mark is detected to detect the velocity of the moving member 53. However, if two or more speckles are produced with respect to one pixel of the area sensor 56, information for two portions of the impressed mark has to be totally added and detected, which results in reduction of an amount of information given from each of the speckle patterns, and thus, it becomes difficult to detect the movement with high accuracy.

Consequently, it is desirable that the minimum speckle diameter should be a size of at least one-half or more of the pixel pitch of the area sensor 56.

Meanwhile, an upper limit of the size of the minimum speckle diameter cannot be set logically unlike the case of a lower limit thereof. Therefore, the upper limit of the minimum speckle diameter with respect to the pixel pitch of the area sensor 56 was experimentally examined.

As experiment conditions, using an image-forming system of light source wavelength $\lambda$=830 nm and image-forming magnification M=0.40 magnification, detection experiments for the moving member 53 were conducted in three cases of the F value of the lens 55: F=8, 12, 16. The pixel pitch of the area sensor 56 at this time is 9.5 µm, and the number of detected pixels are 80×40 pixels. The illuminating light to the moving member 53 was a parallel light.

Under the conditions, the minimum speckle diameter when the F value is F=8 is d=9.3 µm from the Equation (2). Further, when F=12, then d=13.9 µm, and when F=16, then d=18.6 µm.

From the above, it is found that the following minimum speckle diameters are produced: when F=8, then it is almost equal to the pixel pitch, when F=12, then it is about 1.5 times of the pixel pitch, and when F=16, then it is about 2 times of the pixel pitch.

The moving member 53 was fed by 50 μm based on the experiment conditions, and images of the speckle patterns detected by the area sensor 56 were stored. Cross-correlation between each of the images of the speckle patterns acquired by the 50-μm pitch and an initial image of an original point of the movement was computed. A position where a cross-correlation peak was produced was calculated, and an amount of displacement (correlation distance) between the speckle patterns was calculated. Then, a maximum correlation distance was determined, the maximum correlation distance being a maximum moving distance (a maximum amount of displacement between the speckle patterns which can be detected) where the correlation peak was produced with respect to the moved initial image.

Here, as the cross-correlation computation, an ordinary correlation process was performed according to a definition. Further, a pixel pitch ratio was set as follows:

(minimum speckle diameter)/(pixel pitch)=pixel pitch ratio.

The experimental results are shown in the following Table 1

| Lens F value | Minimum speckle diameter [μm] | Pixel pitch ratio | Maximum correlation distance [μm] |
|---|---|---|---|
| 8 | 9.8 | about 1 | 500 |
| 12 | 13.9 | about 1.5 | 450 |
| 16 | 18.6 | about 2 | 250 |

According to the Table 1, as compared with the lens F value F=8, in the case of F=16, the maximum correlation distance was reduced by half. From the result, it is understood that the pixel pitch, in which the maximum correlation distance is reduced by half, has approximately pixel pitch ratio=2 with respect to the pixel pitch ratio=1.

From the above, the minimum speckle diameter on the area sensor plane upon velocity detection of the speckle is at least about one-half or more of the pixel pitch of the area sensor 56, and is desirably at most about twice or less of the pixel pitch.

Figure 10:
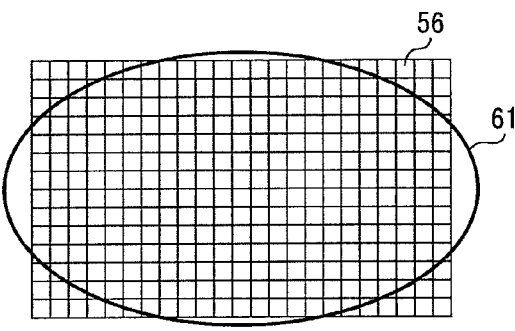
FIG. 10 is a plan view representing one example of a light-receiving area of the area sensor and an image of an illumination area formed on the area sensor.

Next, in FIG. 9, an image of an illumination area on the moving member 53 illuminated by the illuminating light 60 is formed on the light-receiving surface of the area sensor 56 with M image-forming magnifications by the lens 55. FIG. 10 is a plan view of a light-receiving surface (light-receiving area) of the area sensor 56, and represents an illumination-area image 61 formed on the light-receiving surface (light-receiving area) of the area sensor 56. Formed on the illumination-area image 61 is the speckle pattern with the minimum speckle diameter indicated by the Equation (1) and Equation (2). At this time, the size of the light-receiving surface of the area sensor 56 and the size of the illumination-area image 61 with the speckle pattern formed thereon are, desirably, nearly equal to each other. The reason is because the formation of the speckle pattern over the light-receiving surface of the area sensor 56 allows detection of the information on movement of the speckle pattern at a maximum and the velocity can be detected with high accuracy.

Figure 11:
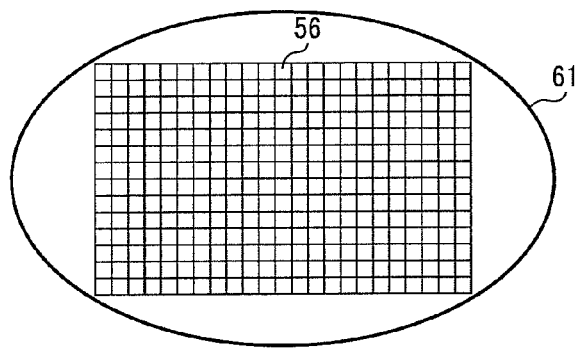
FIG. 11 is a plan view representing another example of a light-receiving area of the area sensor and an image of an illumination area formed on the area sensor.
Figure 12:
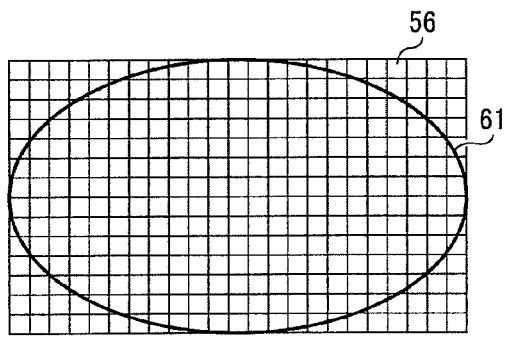
FIG. 12 is a plan view representing another example of a light-receiving area of the area sensor and an image of an illumination area formed on the area sensor.

Here, the approximate equality between the size of the light-receiving surface of the area sensor 56 and the size of the illumination-area image 61 with the speckle pattern formed thereon is not limited to the case of FIG. 10. Therefore, as shown in FIG. 11, the light-receiving area of the area sensor 56 may be nearly inscribed in the illumination-area image 61. Moreover, as shown in FIG. 12, the light-receiving area of the area sensor 56 may be nearly circumscribed to the illumination-area image 61.

As explained above, by appropriately setting the size of the illumination-area image 61 on the light-receiving surface of the area sensor 56, the amount of information on the movement of the speckle pattern can be maximally detected, and the velocity can be detected with high accuracy.

As for the experiments on the upper limit of the minimum speckle diameter, the reason why the upper limit of the minimum speckle diameter is set to about twice or less of the pixel pitch will be explained below based on the results of the Table 1.

In each pixel pitch ratio in the Table 1, an experiment on velocity detection is conducted by detecting speckle correlation when the moving velocity of the medium is about 300 mm/s, and the next result is obtained.

Figure 13:
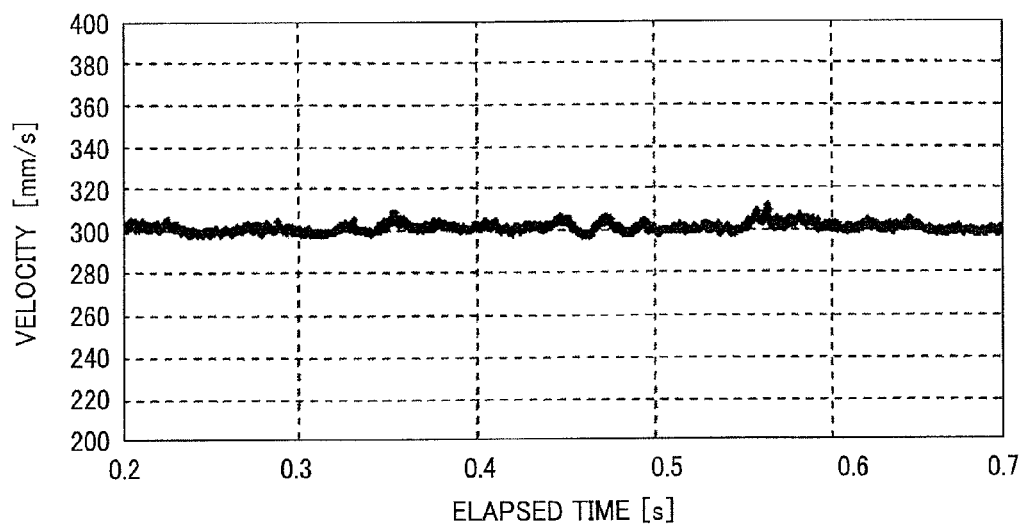
FIG. 13 is a graph representing a detection result of velocity when a maximum correlation distance is 500 μm in an experiment for detection of velocity.
Figure 14:
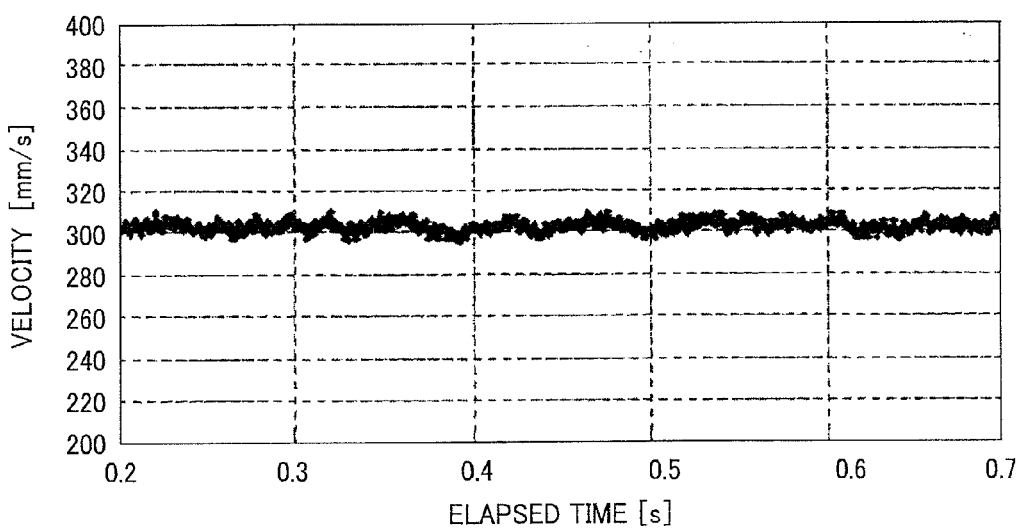
FIG. 14 is a graph representing a detection result of velocity when the maximum correlation distance is 250 μm in the experiment for detection of velocity.

When the pixel pitch ratio is about 1 (maximum correlation distance is 500 μm), the detection result of the velocity is as shown in the graph of FIG. 13, and the velocity can be successfully detected. When the pixel pitch ratio is about 2 (maximum correlation distance is 250 μm), as shown in the graph of FIG. 14, the velocity can be detected at a level that has practically no problem.

Figure 15:
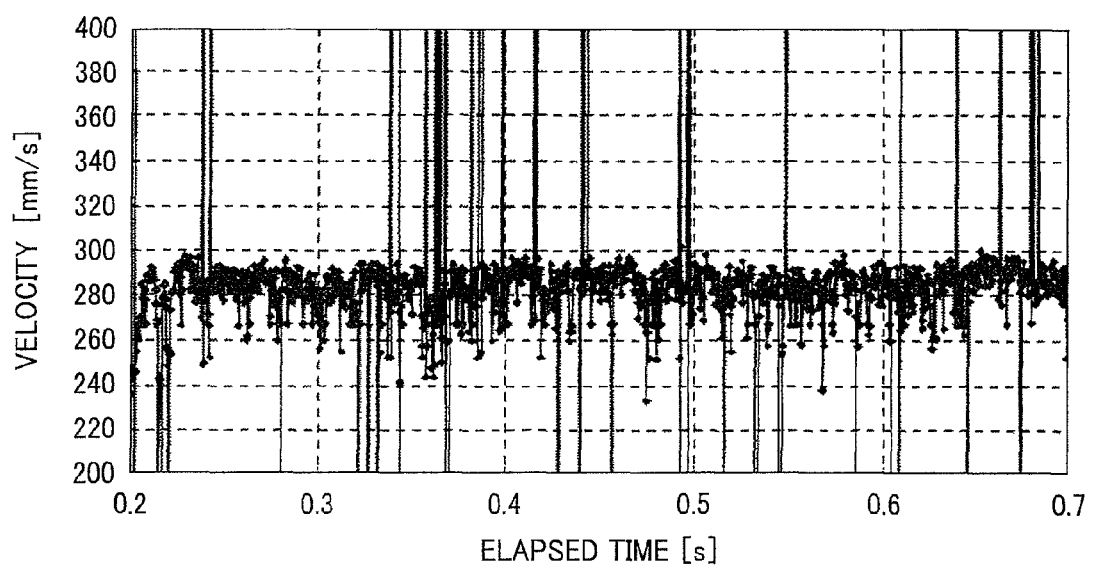
FIG. 15 is a graph representing a detection result of velocity when the maximum correlation distance is 200 μm in the experiment for detection of velocity.

However, if the pixel pitch ratio is about 2.8 which indicates that the maximum correlation distance determined under the similar experiment conditions is 200 μm being shorter than 250 μm, the detection result of the velocity is as shown in the graph of FIG. 15, which indicates that the velocity cannot practically be measured.

Therefore, as the upper limit of the minimum speckle diameter, the' maximum correlation distance is desirably 250 μm or more, or the pixel pitch ratio is desirably about 2 or less (about twice or less of the pixel pitch).

Next, to detect the change in velocity of the moving member 53 by the velocity detecting device according to the implementation example, it is preferable to continuously acquire an image pattern (speckle pattern) at a constant time interval. A method of detecting velocity fluctuation of the moving member 53 using speckle patterns obtained at the constant time interval can be implemented, first, by using two speckle patterns temporally adjacent to each other to compute a moving amount of the speckle patterns. Here, two speckle patterns being temporally apart from each other are large in the moving amount. When the moving amount of the speckle patterns is increased, the speckle patterns are easily deformed, which may cause an error upon detection of velocity fluctuation to be increased. Therefore, the method of determining the moving amount of speckle patterns by computing it using the temporally continuous two speckle patterns is more appropriate for the present invention because of a less detection error in the detection of the velocity fluctuation.

Here, assuming that the moving amount between the two speckle patterns is $\Delta$ and a time interval of the two speckle patterns is $\tau$, a partial velocity v of the moving member 53 is determined as $$v = k\Delta/\tau.$$

By repeating the calculation of the v by updating the two speckle images, the velocity fluctuation of the moving member 53 can be detected. Here, k is a proportion constant, and it is determined by optical conditions such as positions of a laser and a lens. Therefore, it is necessary to previously determine k.

When a width of a laser light (beam) on the moving member in the direction of forward movement of the moving member 53 is set as ws, a relation between ws and τ is important, and by setting ws and τ so as to be $$2v\tau < ws < 10v\tau,$$

the moving amount of the speckle patterns or the velocity fluctuation of the moving member 53 can be determined with high accuracy. The beam diameter ws is defined as a width so as to be an intensity of 1/e 2 of a peak intensity. If ws becomes smaller than 2vτ, a capturing interval is too long with respect to the size of the beam, and the moving amount in the two speckle patterns becomes too large, so that the speckle patterns are deformed and an error upon determination of the moving amount through the computation is thereby increased. If ws becomes larger than 10vτ, then the beam diameter becomes too large, so that a light-use efficiency is decreased and the velocity fluctuation of the high-velocity moving member 53 cannot thereby be detected. Moreover, the capturing time becomes too short, and thus very high-velocity capability is always required to compute the moving amount of the speckle patterns, which causes an increase in power consumption, a cost increase, and negative effects such that the computation cannot keep up with the moving amount.

It should be noted that the area sensor 56 can be anything if it can detect a one-dimensional or a two-dimensional image pattern. For example, a CCD (charge coupled device), a CMOS (complementary metal-oxide semiconductor) sensor, and a photodiode (PD) array can be used. Moreover, if a one-dimensional area sensor is used, the longitudinal direction of the area sensor 56 needs to be set to nearly parallel with the moving direction of the moving member (belt, etc.) 53.

When the velocity detecting device according to the implementation example is applied to the multi-color image forming apparatus as shown in FIG. 1 or FIG. 2, velocity fluctuation of the moving member (the intermediate transfer belt 105 and the conveyor belt 106) 53 in the direction of forward movement thereof is a problem, and thus the one-dimensional area sensor is preferably used as the area sensor 56. By doing so, the data amount to be computed can be largely reduced, which allows high-speed computation and suppression of power consumption to be low.

Figure 5:
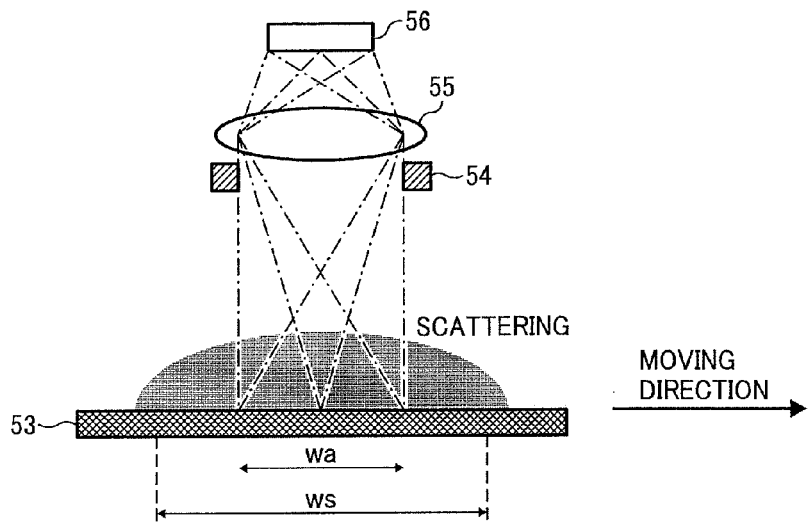
FIG. 5 is a schematic representing an area capable of forming an image on an area sensor of the velocity detecting device shown in FIG. 3.

As shown in FIG. 5, if the width of an area, on the surface of the moving member 53 in the direction of forward movement thereof (moving direction), capable of forming the image on the area sensor 56 is wa, it is preferable to set a magnification of the lens 55 and a size of an incident beam so as to satisfy the following expression.

$$wa < ws < 5wa$$

In the expression, if ws becomes smaller than wa, an intensity distribution of the light source is produced to such an extent as not to be negligible in the area capable of forming an image on the area sensor 56 (direction of forward movement of the moving member), which causes an error to easily occur in the velocity detection. Furthermore, if ws becomes larger than wa, an intensity distribution of the light source can be negligible in the area capable of forming an image on the area sensor 56 (direction of forward movement of the moving member 53). However, if ws becomes larger than 5wa, then an amount of light incident on the area sensor 56 becomes less, which is not preferable. Therefore, by setting these values so as to satisfy $$wa < ws < 5wa,$$

the intensity distribution of the light source can be negligible in the area capable of forming an image on the area sensor 56 (direction of forward movement of the moving member 53), which allows velocity detection with high accuracy and acquisition of a sufficient light amount in the area sensor 56.

There is considered a case (generically called "endless moving member" in the present invention) where the moving member 53 has no ends and the surface thereof is made a loop as the form of an endless belt (both ends are joined to make the loop) or as the form of a drum. Explanation is made below using the belt-like moving member as an example, however, the case of the endless moving member with no ends such as the form of the drum can also be considered in the above manner.

When the moving member 53 is in the form of a belt, a home position is necessary to be detected. In the image forming apparatus in particular, it is especially important to apply the velocity detecting device according to the present invention to detection of the velocity fluctuation of the intermediate transfer belt 105 shown in FIG. 1 or of the conveyor belt 106 shown in FIG. 2. Because there is a possibility that color misregistration may occur due to periodicity of non-uniform thickness or non-uniform rotation of the belt. If the home position can be detected, a detection error in one cycle of the belt can be corrected, and thus the velocity fluctuation of the belt can be detected with a higher degree of accuracy.

A method of detecting the home position may be a method of making a mark on the belt and detecting the mark. However, the best for the present invention is a method of computing an image pattern (speckle pattern) previously acquired at a position corresponding to the home position and a newly acquired image pattern. This method is implemented by only providing a storage unit (e.g., nonvolatile memory) that stores therein the speckle pattern corresponding to the home position, which is very simple. Moreover, there is no need to process the belt to make the mark thereon, and thus, the method can be implemented with low cost.

As a specific method of detecting the home position, first, a speckle pattern is acquired at a position estimated as the home position. The position of acquiring the speckle pattern is set as x0'. Next, a displacement Δx0 of a speckle pattern, acquired by computing the previously stored speckle pattern corresponding to the home position and the acquired speckle pattern, with respect to the speckle pattern corresponding to the home position is determined. Consequently, a position x0 of the home position can be determined as $$x0 = x0' + \Delta x0.$$

As another method, it can be considered using a time. A time of acquiring a speckle pattern at a position estimated as the home position is set as t0'. Next, Δx0 is determined. A partial moving velocity v of the belt is determined by the method using the speckle pattern acquired at the position estimated as the home position and a speckle pattern temporally continuous or temporally close to the speckle pattern. Consequently, a time t0 of the home position can be determined as $$t0 = t0' + \Delta x0/v.$$

As explained above, by continuously determining the partial moving velocity v of the belt, a length and a time of one cycle of the belt can be determined. However, if the one cycle of the belt is long, a slight error upon determination of the partial moving velocity v is accumulated, and there may cause a non-negligible amount of error to occur in the length and the time of the one cycle of the belt. However, the detection of the home position allows correction of the error. A displacement Δx0 between the previously stored position x0 of the home position and the position x0' of the estimated home position is the error accumulated during one cycle of the belt. Furthermore, if the error in the one cycle of the belt is made out, by converting the error into a proportion using the error, the partial moving velocity v or the error in the result of detection of any position during the one cycle of the belt can be corrected, and this allows detection of the velocity fluctuation of the belt with a higher degree of accuracy.

As for the previously stored speckle pattern corresponding to the home position, it is most preferable to store it upon factory shipment, however, it is also possible to store it upon calibration at the time of power-on.

To detect the velocity fluctuation of the endless moving member such as a belt and a drum with a higher degree of accuracy, as explained above, it is preferable to detect not one point such as the home position but detect a plurality of positions on the endless moving member, which allows successive correction of detection errors of the velocity fluctuation at the positions on the endless moving member, so that the velocity fluctuation of the endless moving member can be detected with a higher degree of accuracy.

As a method of detecting a plurality of positions of the endless moving member (e.g., belt), it is preferable to make the mark on the belt and detect the mark, however, a most desirable method for the present invention is a method of previously acquiring speckle patterns corresponding to a plurality of positions of the belt and storing them in a storage unit. By storing speckle patterns corresponding to a plurality of positions $x1, x2, \ldots, xn$ in the direction of forward movement of the belt and detecting displacements $\Delta x1, \Delta x2, \ldots, \Delta xn$ between $x1, x2, \ldots, xn$ and positions of speckle patterns $x1', x2', \ldots, xn'$ acquired at estimated positions respectively using the same method as the above-mentioned method, not only an error of one cycle of the belt but also an error at any point of the positions $x1, x2, \ldots, xn$ of the belt can be detected, and this allows correction of the velocity fluctuation of the belt with high accuracy.

The above explains the method of detecting the velocity fluctuation of the belt basically using two image patterns which are temporally continuous to each other or are temporally close to each other, of speckle patterns acquired at constant time intervals. However, as another method, the following method is also possible.

Speckle patterns of the moving member at positions at a constant interval (the constant interval is not necessarily required) in the direction of forward movement of the moving member are previously stored. By computing a moving amount between the acquired speckle pattern and the stored speckle pattern, a displacement between the position where the speckle pattern is acquired and the stored position can be calculated. For example, a moving amount between the speckle pattern stored at the position $x1$ on the moving member and the speckle pattern acquired at the position $x1'$ estimated as the position $x1$ where the speckle pattern is stored is computed. If the moving amount is $\Delta x1$, the position $x1$ is obtained as follows:

$$x1=x1'+\Delta x1.$$

By repeatedly performing the computation at the positions $x1, x2, \ldots, xn$ where the speckle patterns are respectively stored, the displacements $\Delta x1, \Delta x2, \ldots, \Delta xn$ can be determined, and the velocity fluctuation of the moving member can be detected.

The surface roughness of the surface of the moving member 53 is desirably higher because the higher surface roughness causes a scattering light to become strong. Furthermore, a fine irregularity structure of the surface (profile of the surface roughness) is desirable not to change with time. If the irregularity structure is not degraded with time, the speckle pattern will not change. If the speckle pattern is changed, an error may be increased with time when the computing process is performed on the speckle pattern and the stored speckle pattern. Moreover, if the irregularity structure is worn to be small, a light scattering intensity becomes low, which may cause insufficient light amount, and thus detection accuracy may be degraded. Consequently, by protecting the fine irregularity structure of the moving surface, the detection accuracy of the velocity can be prevented from being degraded with time. To protect the fine irregularity structure of the moving member 53, it is preferable to coat the surface of the moving member 53 with a light transmissive medium.

Moreover, if it is considered that the moving member 53 is applied to the intermediate transfer belt or the like of the image forming apparatus, it is desirable that the belt surface is flat because dust of toner or so can be prevented upon the transfer. Therefore, it is preferable that the surface roughness of an interface between the light transmissive medium and its lower medium is set to be higher than the surface roughness of the surface of the light transmissive medium. This allows the flatness of the surface of the belt to be maintained, and the strong scattering light is caused to be generated on the interface between the light transmissive medium and its lower medium because the surface of the belt is coated with the light transmissive medium, which is preferable. If the surface roughness of the uppermost surface of the belt is made rough, then image degradation is thereby caused upon the transfer, which is not preferable. By doing as above, the strong scattering light can be obtained without causing image degradation.

Here, the light transmissive medium is not necessary to be optically perfectly transparent, and, thus, may absorb the light a little.

The computation in which a moving amount is calculated from the two speckle patterns is preferably performed by using the cross-correlation computation. The cross-correlation computation is expressed by the following equation. Here, f1 and f2 are two speckle patterns, F[ ] is Fourier transform, $F^{-1}$[ ] is inverse Fourier transform, symbol ★ represents cross-correlation computation, and * represents phase conjugation.

$$f1 \star f2^* = F^{-1}[F[f1] \cdot F[f2]^*]$$

f1 ★ f2* is image data after the cross-correlation computation, and if f1 and f2 are a two-dimensional image, then the data is two-dimensional data, and if f1 and f2 are a one-dimensional image, then the data is one-dimensional data. In the image data of f1 ★ f2*, a position (center of the image is 0) of a steepest peak (correlation peak) intensity represents an amount of displacement (correlation distance) between the two speckle patterns. Therefore, by performing computation to search for the steepest peak, the moving amount of the two speckle patterns can be calculated. The method of using the cross-correlation computation can use fast Fourier transform, and thus, it is possible to detect an amount of the displacement (correlation distance) of the speckle patterns with a comparatively less amount of computation and with high accuracy.

Figure 6A:
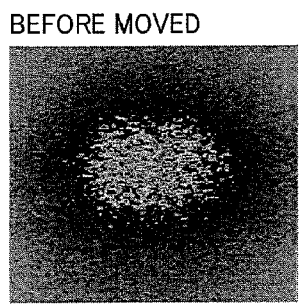
FIGS. 6A to 6D are schematics representing results of experiments in which a laser light is irradiated to a scattering medium, the scattering medium is photographed by a CCD camera, and a cross-correlation computation is performed thereon.
Figure 6B:
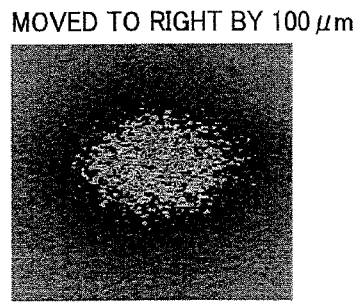
Figure 6C:
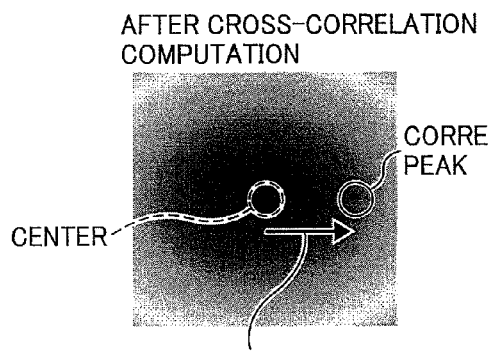

Implementation examples are shown in FIGS. 6A to 6D. FIGS. 6A to 6D represent results of experiments in which a laser light is irradiated to a scattering medium, the scattering medium is photographed by a CCD camera, and a cross-correlation is computed, and represent the implementation examples in which FIG. 6A indicates "before moved" and FIG. 63 indicates "moved to right by 100 μm". The lens is disposed in front of the CCD camera, and the surface of the scattering medium and the surface of the CCD are nearly conjugated, and a photographing magnification is about one-time magnification. Because the photographing magnification is one-time magnification, the moving amount of the speckle pattern calculated from the position of the correlation peak coincides with the moving amount of the scattering medium. FIG. 6C represents an image pattern after the cross-correlation computation, which shows occurrence of a steep correlation peak (surrounded by a white circle) in a broad intensity distribution. It should be noted that the center of the image data is surrounded by a white dotted circle. The correlation peak is not buried in the broad intensity distribution. However, because the peak of the broad intensity distribution may become higher than the correlation peak, it is important to search for the position of the steepest peak.

When the broad intensity distribution becomes a problem, phase-only correlation is simply used. The phase-only correlation is expressed by the following equation, where P[ ] represents that only the phase is extracted (all the amplitudes are set to 1) in a complex amplitude.

$$f1 \star f2^* = F^{-1}[P[F[f1]] \cdot P[F[f2]]^*]$$

Figure 6D:
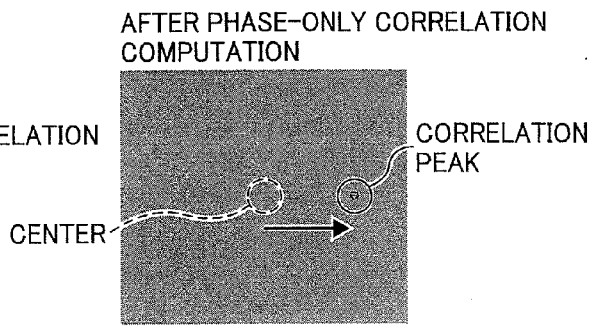

The implementation example calculated by the phase-only correlation is shown in FIG. 6D. As is clear from FIG. 6D, the broad intensity distribution as having occurred in FIG. 6C does not occur, but there is only the correlation peak therein. The method of using the phase-only correlation in this manner can calculate a displacement between the two speckle patterns with a higher degree of accuracy.

The velocity detecting device explained above can be used for detecting velocity fluctuation within one cycle of the belt such as the intermediate transfer belt (in the intermediate transfer belt system) or the conveyor belt (in the direct transfer system) used in the multi-color image forming apparatus. This allows detection of the velocity fluctuation of the intermediate transfer belt or the conveyor belt, and allows a belt-velocity correcting unit for correcting the velocity of the intermediate transfer belt or the conveyor belt to control so that the velocity fluctuation becomes nearly 0 by feeding information from the belt-velocity correcting unit back to, for example, a drive motor. As a result, it is possible to provide a high-quality color image in which expansion and contraction of an image and color misregistration are suppressed to a low level.

Moreover, the velocity detecting device as explained above is used, to enable detection and correction of the velocity fluctuation of a belt-like member or of a roller-like member for use as a fixing device.

Furthermore, the detection result of the velocity fluctuation of the intermediate transfer belt or the conveyor belt can be fed back to a write-start-position correcting unit (e.g., a liquid-crystal deflecting element provided in the optical scanning device) that corrects a write start position performed by the optical scanning device 20. The liquid-crystal deflecting element can displace the position of the light reaching the photosensitive drum, by a voltage applied to the liquid crystal, in a direction parallel to the direction of rotation of the photosensitive drum. When the velocity fluctuation of the belt occurs, superimposed images of the respective colors are displaced or the images themselves of the respective colors are expanded or contracted. However, by using the liquid-crystal deflecting element, the positions of forming the toner images of the respective colors or the expansion and contraction of the images can be corrected, just like the case of correcting the velocity fluctuation of the belt. As a result, a high-quality output image without color misregistration and expansion and contraction of the image can be obtained.

Figure 7:
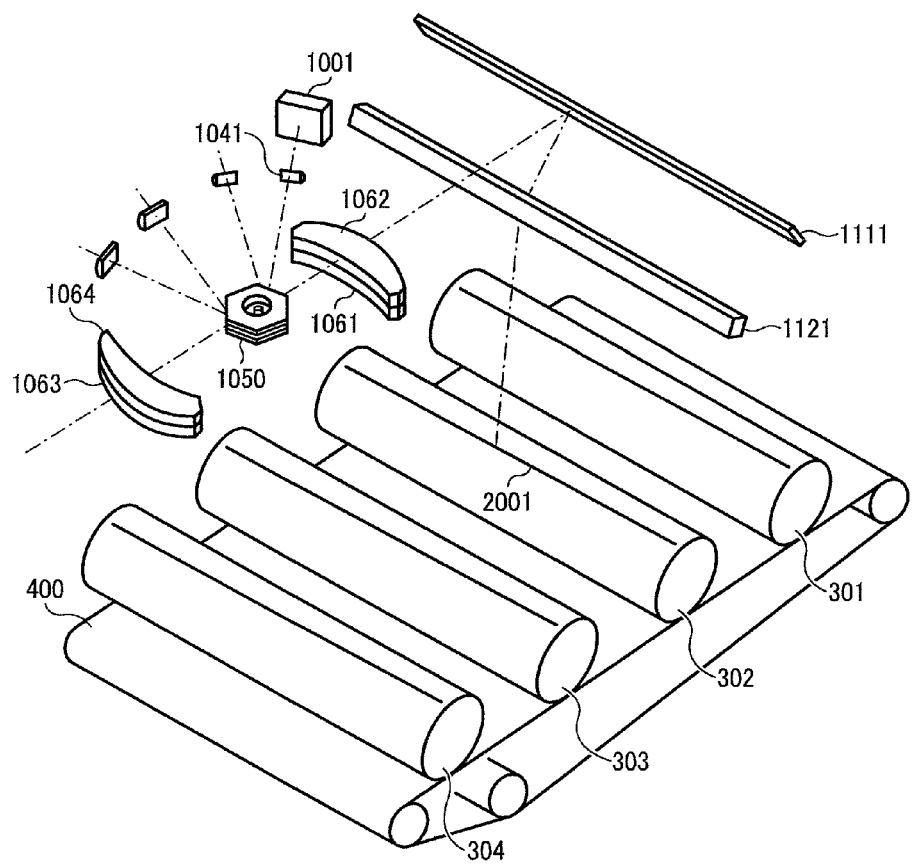
FIG. 7 is a schematic configuration diagram representing one example of an optical scanning device provided in the multi-color image forming apparatus.

Next, the optical scanning device using the liquid-crystal deflecting element is explained. FIG. 7 is a schematic configuration diagram representing one example of the optical scanning device provided in the multi-color image forming apparatus.

FIG. 7 represents an image forming apparatus in which four photosensitive drums 301, 302, 303, and 304 (which correspond to the photosensitive drums 1Y, 1M, 1C, and 1K in FIG. 1 or FIG. 2) are arranged along a moving direction of a transfer belt 400 (which corresponds to the intermediate transfer belt 105 of FIG. 1 or to the conveyor belt 106 of FIG. 2) and toner images of different colors are successively transferred thereto to form a color image. In the image forming apparatus, all the light beams are scanned by a single optical deflector (e.g., polygon mirror) 1050 obtained by integrally configuring optical scanning devices. The polygon mirror 1050 has six facets and a two-stage structure.

More specifically, the optical scanning device includes a light source unit 1001, the single polygon mirror 1050 that deflects and scans the light beam from the light source unit 1001, and scanning lenses 1061, 1062, 1063, and 1064 that form the scanning beams scanned by the polygon mirror 1050 on surfaces to be scanned of the photosensitive drums 301, 302, 303, and 304 respectively. Here, the light beam is scanned for two stations in opposite directions with respect to the polygon mirror 1050. In FIG. 7, an optical system in the downstream of the light source unit and the scanning lenses is shown only for one station for simplicity in the explanation.

The light source unit 1001 includes a light source (e.g., a semiconductor laser (LD) and an LD array), a coupling lens, and an aperture. A light flux emitted from the light source (not shown) of the light source unit 1001 is formed into a nearly parallel light or into a nearly divergent light flux or into a nearly convergent light flux by the coupling lens (not shown), and, thereafter, is cut into a desired light flux width by the aperture (not shown), is once collected to a sub-scanning direction near the polygon mirror 1050 by a linear-image forming lens (e.g., cylindrical lens) 1041, to form a beam spot on an image plane (surface to be scanned) 2001 by a scanning optical system formed with a scanning lens L1: 1061. In this manner, in order to reduce degradation of the optical characteristics due to surface tilt between the mirrors of the polygon mirror 1050, the ordinary optical scanning device adopts a surface-tilt correction optical system that collects the light once near the polygon mirror in the sub-scanning direction. The scanning lens is made of resin, and diffraction grating may be formed on one or a plurality of optical surfaces. Generally, return mirrors 1111 and 1121 are inserted into between a light polarizing unit and the image plane, so that light paths are folded. The implementation example in which the scanning system is formed with one scanning lens is shown, however, two or more scanning lenses may be used.

Figure 8:
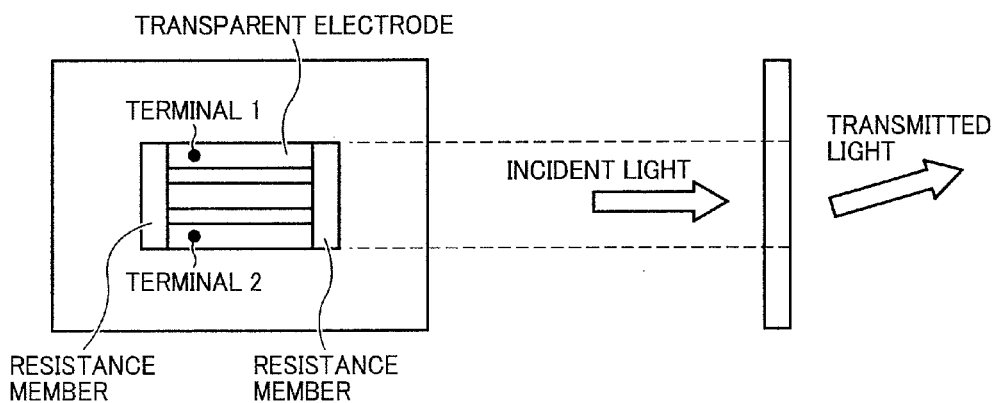
FIG. 8 is a schematic diagram representing a structural example of a liquid-crystal deflecting element.

Here, the write-start-position correcting unit (e.g., liquid-crystal deflecting element) that corrects a write start position by the optical scanning device is preferably provided between the coupling lens of the light source unit 1001 and the cylindrical lens 1041. The liquid-crystal deflecting element is an element for deflecting a light by using the fact that application of a voltage to the element causes a refractive index with respect to the light having a certain polarization direction to change. Therefore, the liquid-crystal deflecting element can be implemented by using not only the liquid crystal but also other electric optical materials such as $LiNbO_3$. In the following, the electric optical material will be explained using the liquid crystal as an example. FIG. 8 is a schematic diagram representing a structure of the liquid-crystal deflecting element.

The structure of the liquid-crystal deflecting element is such that transparent electrodes 1, 2, ..., n are electrically connected thereto through resistance members. Here, a potential difference is provided between a terminal 1 and a terminal 2, and a potential at the transparent electrode changes nearly linearly along from the terminal 1 toward the terminal 2. By applying a voltage to the liquid crystal, the refractive index with respect to the light being polarized along the optical axis of the liquid crystal changes, and thus the refractive index of the portion provided with the transparent electrode changes linearly along from the terminal 1 to the terminal 2. This is equivalent to a prism, and therefore the light having transmitted the portion with the transparent electrode is deflected as shown in the figure. By changing the potential difference between the terminal 1 and the terminal 2, an amount to be deflected can be changed. By matching the direction to be deflected with the direction of rotation of the photosensitive drum (sub-scanning direction), the positions of forming the toner images of the respective colors and the expansion and contraction of the images can be corrected.

According to an aspect of the present invention, downsizing of the velocity detecting device can be achieved. Moreover, the load of an electronic circuit can be reduced and the processing speed of the electronic circuit can be reduced, and the cost reduction and the low power consumption can thereby be achieved.

According to an aspect of the present invention, the area sensor is resistant to disturbance and can thereby stably detect the velocity.

According to an aspect of the present invention, a detection error upon detection of velocity fluctuation can be suppressed to a low level.

According to an aspect of the present invention, the velocity fluctuation of the moving member can be detected with high accuracy without causing the computational processing speed to be increased so much while the reduction of light use efficiency is suppressed.

According to an aspect of the present invention, an intensity distribution of the light source can be negligible in the area capable of forming an image on the area sensor (direction of forward movement of the moving member), which allows detection of the velocity with high accuracy, and a sufficient light amount can thereby be obtained in the area sensor.

According to an aspect of the present invention, a detection error upon detection of velocity fluctuation can be suppressed to a low level.

According to an aspect of the present invention, when the moving member is in the form of a belt, an accumulated error for one cycle of the belt, even if each error to be accumulated is a slight error in a one detection result of the velocity, can be corrected, and an error in the result of detection of any position along the one cycle of the belt can further be corrected, which allows detection of the velocity fluctuation with a higher degree of accuracy.

According to an aspect of the present invention, when the moving member is in the form of a belt, a detection error of the velocity fluctuation can be corrected at a plurality of positions along the belt, which allows detection of the velocity fluctuation with a higher degree of accuracy.

According to an aspect of the present invention, the same effects as these of the first to the tenth units can be obtained.

According to an aspect of the present invention, when the image of the moving member is formed on the plane of the area sensor by using the lens, by optimizing the size of the minimum speckle diameter on the plane of the area sensor and the pixel pitch of the area sensor, the maximum correlation distance can be made longer, which allows detection of the velocity with high accuracy.

According to an aspect of the present invention, the amount of shading information for the speckle pattern can be maximally detected. More specifically, the image of the laser-beam illumination area on the moving member is formed on the plane of the area sensor by using the lens, and the image is formed on the plane of the area sensor as an illumination-area image where the speckle pattern is produced. By making the size of the illumination-area image and the size of the detection area of the area sensor nearly equal to each other, the amount of shading information for the speckle pattern can be maximally detected, which allows detection of the velocity with high accuracy.

According to an aspect of the present invention, temporal degradation of velocity detection accuracy can be suppressed. Moreover, when it is considered that the velocity detecting device is applied to the multi-color image forming apparatus, the surface of the belt is formed as a flat plane having optical transparency, it is thereby possible to suppress degradation of image quality upon the transfer and also generate a strong scattered light by the plane, provided inside the belt, of which roughness is higher than that of the belt surface. Therefore, the strong scattered light can be obtained without causing the degradation of image quality.

According to an aspect of the present invention, it is possible to detect an amount of displacement of the speckle pattern with a comparatively less amount of computation and with high accuracy.

According to an aspect of the present invention, it is possible to calculate the displacement of the two speckle patterns with a higher degree of accuracy.

According to an aspect of the present invention, it is possible to obtain a high-quality multi-color or full-color image in which expansion and contraction of an image or color misregistration are suppressed to a low level.

According to an aspect of the present invention, it is possible to obtain a high-quality multi-color or full-color image in which expansion and contraction of an image or color misregistration are suppressed to a low level.

According to an aspect of the present invention, it is possible to calculate the displacement of the two speckle patterns with a higher degree of accuracy.

According to an aspect of the present invention, it is possible to obtain a high-quality multi-color or full-color image in which expansion and contraction of an image or color misregistration are suppressed to a low level.

According to an aspect of the present invention, it is possible to obtain a high-quality multi-color or full-color image in which expansion and contraction of an image or color misregistration are suppressed to a low level.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image forming apparatus, comprising:
an image forming unit having a moving member; and
a velocity detecting device that detects velocity and velocity fluctuation of the moving member, wherein the velocity detecting device includes:

an image-pattern acquiring unit that
    includes a laser light source and an area sensor that acquires a one-dimensional or a two-dimensional image,
    provides a lens between the moving member and the area sensor,
    irradiates a beam emitted from the laser light source to the moving member to make a scattering light of the moving member scattered from the moving member, and
    acquires an image pattern on the area sensor derived from the scattering light by using the lens at a predetermined time interval in association with movement of the moving member; and
a velocity calculating unit that calculates velocity of the moving member by computing a plurality of the image patterns acquired by the image-pattern acquiring unit,
wherein the lens is a reduced optical system that projects a reduced object onto the area sensor.

2. The apparatus according to claim 1, wherein a width of a beam on the moving member in a direction of forward movement of the moving member is ws, velocity of the moving member is v, a time interval for acquiring the image pattern is τ, and 2vτ<ws<10vτ.

3. The apparatus according to claim 1, wherein when a width of a beam on the moving member in a direction of forward movement of the moving member is ws and a width of an area, on the surface of the moving member in the direction of its forward movement, capable of forming an image on the area sensor is wa, wa<ws<5wa is satisfied.

4. The apparatus according to claim 1, wherein two image patterns temporally adjacent to each other are used to calculate velocity of the moving member.

5. The apparatus according to claim 1, wherein the moving member is an endless moving member, and the velocity detecting device further comprises a home position detector that detects a home position of the moving member.

6. The apparatus according to claim 5, wherein the home position detector includes a storage unit that stores therein an image pattern at a position corresponding to the home position, and detects the home position by computing stored image pattern and an image pattern acquired by the image-pattern acquiring unit.

7. The apparatus according to claim 1, wherein the moving member is an endless moving member, and the velocity detecting device further comprises a position detector that detects a plurality of positions on the moving member; and a velocity-calculation-result correcting unit that corrects the velocity calculated by the velocity calculating unit by using a result of detection by the position detector.

8. The apparatus according to claim 7, wherein the position detector includes a storage unit that stores therein image patterns corresponding to a plurality of positions on the moving member, and detects each position by computing stored image pattern and an image pattern acquired by the image-pattern acquiring unit.

9. The apparatus according to claim 1, wherein the image pattern is a speckle pattern, and a minimum speckle diameter of the speckle pattern on a plane of the area sensor is at least nearly one-half or more of a pixel pitch of the area sensor.

10. The apparatus according to claim 1, wherein the image pattern is a speckle pattern, and a size of an irradiated area image where the speckle-pattern is formed is nearly equal to a size of a light-receiving surface of the area sensor.

11. An image forming apparatus, comprising:
an image forming unit having a moving member; and
a velocity detecting device that detects velocity and velocity fluctuation of the moving member, wherein the velocity detecting device includes:
an image-pattern acquiring unit that
    includes a laser light source and an area sensor that acquires a one-dimensional or a two-dimensional image,
    provides a lens between the moving member and the area sensor,
    irradiates a beam emitted from the laser light source to the moving member to make a scattering light of the moving member scattered from the moving member, and
    acquires an image pattern on the area sensor derived from the scattering light by using the lens at a predetermined time interval in association with movement of the moving member; and
a velocity calculating unit that calculates velocity of the moving member by computing a plurality of the image patterns acquired by the image-pattern acquiring unit,
wherein the lens is a reduced optical system that projects a reduced object onto the area sensor, and
wherein the image forming unit includes a multi-color image forming apparatus that includes: a plurality of image carriers; an optical scanning device that optically scans the plurality of image carriers with each beam spot to form electrostatic latent images; a developing unit that visualizes each of the electrostatic latent images formed on the plurality of image carriers by the optical scanning device with toner of each color; an intermediate transfer belt movably provided opposed to the plurality of image carriers; first and second transfer units; and a fixing unit, wherein toner images of colors visualized on the plurality of image carriers are transferred to the intermediate transfer belt by the first transfer unit, the toner images of the colors are superimposed on one another on the intermediate transfer belt, superimposed toner images of the colors are transferred to a sheet-like recording medium by the second transfer unit, the toner images of the colors transferred to the recording medium are fixed thereon by the fixing unit, to form a multi-color or color image, and wherein the movable member is the intermediate transfer belt, and the velocity detecting device detects velocity of the intermediate transfer belt.

12. A multi-color image forming apparatus comprising:
a plurality of image carriers;
an optical scanning device that optically scans the plurality of image carriers with each beam spot to form electrostatic latent images;
a developing unit that visualizes each of the electrostatic latent images formed on the plurality of image carriers by the optical scanning device with toner of each color;
a conveyor belt that is movably provided opposed to the plurality of image carriers and conveys a sheet-like recording medium;
a transfer unit; and
a fixing unit, wherein each of toner images of colors visualized on the plurality of image carriers is directly transferred to the recording medium conveyed by the conveyor belt using the transfer unit, the toner images of the colors are superimposed on one another on the recording medium, the toner images of the colors superimposed on the recording medium are fixed thereon by the fixing unit, to form a multi-color or color image, wherein the multi-color image forming apparatus further comprises a velocity detecting device that detects velocity and velocity fluctuation of the moving member,
wherein the velocity detecting device includes:
an image-pattern acquiring unit that
includes a laser light source and an area sensor that acquires a one-dimensional or a two-dimensional image,
provides a lens between the moving member and the area sensor,
irradiates a beam emitted from the laser light source to the moving member to make a scattering light of the moving member scattered from the moving member, and
acquires an image pattern on the area sensor derived from the scattering light by using the lens at a predetermined time interval in association with movement of the moving member; and
a velocity calculating unit that calculates velocity of the moving member by computing a plurality of the image patterns acquired by the image-pattern acquiring unit, and
wherein the lens is a reduced optical system that projects a reduced object onto the area sensor, and
the velocity detecting device detects velocity of the conveyor belt.

13. The image forming apparatus according to claim 11, further comprising at least one of a write-start-position correcting unit that corrects a write start position by the optical scanning device and a belt-velocity correcting unit that corrects velocity of the intermediate transfer belt or the conveyor belt.

14. The multi-color image forming apparatus according to claim 12, further comprising at least one of a write-start-position correcting unit that corrects a write start position by the optical scanning device and a belt-velocity correcting unit that corrects velocity of the intermediate transfer belt or the conveyor belt.

15. A velocity detecting device that is included in an image forming apparatus and that detects velocity and velocity fluctuation of a moving member in an image forming unit in the image forming apparatus, the velocity detecting device comprising:
an image-pattern acquiring unit that
includes a laser light source and an area sensor that can acquire a one-dimensional or a two-dimensional image,
provides a lens between the moving member and the area sensor,
irradiates a beam emitted from the laser light source to the moving member to make a scattering light of the moving member scattered from the moving member, and
acquires an image pattern on the area sensor derived from the scattering light by using the lens at a predetermined time interval in association with movement of the moving member; and
a storage unit that previously stores therein image patterns corresponding to a plurality of positions on the moving member,
wherein the moving member is an endless moving member,
the velocity of the moving member is detected by computing the image pattern stored in the storage unit and the image pattern acquired by the image-pattern acquiring unit, and
the image forming unit controls moving of the moving member based on the velocity of the moving member.

16. The velocity detecting device according to claim 15, wherein the image pattern is a speckle pattern, and a minimum speckle diameter of the speckle pattern on a plane of the area sensor is at least nearly one-half or more of a pixel pitch of the area sensor.

17. The velocity detecting device according to claim 15, wherein the image pattern is a speckle pattern, and a size of an irradiated area image where the speckle-pattern is formed is nearly equal to a size of a light-receiving surface of the area sensor.

18. A multi-color image forming apparatus comprising: a plurality of image carriers; an optical scanning device that optically scans the plurality of image carriers with each beam spot to form electrostatic latent images; a developing unit that visualizes each of the electrostatic latent images formed on the plurality of image carriers by the optical scanning device with toner of each color; an intermediate transfer belt movably provided opposed to the plurality of image carriers; first and second transfer units; and a fixing unit, wherein toner images of colors visualized on the plurality of image carriers are transferred to the intermediate transfer belt by the first transfer unit, the toner images of the colors are superimposed on one another on the intermediate transfer belt, superimposed toner images of the colors are transferred to a sheet-like recording medium by the second transfer unit, the toner images of the colors transferred to the recording medium are fixed thereon by the fixing unit, to form a multi-color or color image,
wherein the multi-color image forming apparatus further comprises a velocity detecting device, and
wherein the velocity detecting device detects velocity and velocity fluctuation of a moving member in an image forming unit in the image forming apparatus, the velocity detecting device comprising:
an image-pattern acquiring unit that
includes a laser light source and an area sensor that can acquire a one-dimensional or a two-dimensional image,
provides a lens between the moving member and the area sensor,
irradiates a beam emitted from the laser light source to the moving member to make a scattering light of the moving member scattered from the moving member, and
acquires an image pattern on the area sensor derived from the scattering light by using the lens at a predetermined time interval in association with movement of the moving member; and
a storage unit that previously stores therein image patterns corresponding to a plurality of positions on the moving member,
wherein the moving member is an endless moving member,
the velocity of the moving member is detected by computing the image pattern stored in the storage unit and the image pattern acquired by the image-pattern acquiring unit, and
the image forming unit controls moving of the moving member based on the velocity of the moving member; and
wherein the velocity detecting device detects velocity of the intermediate transfer belt.

19. A multi-color image forming apparatus comprising: a plurality of image carriers; an optical scanning device that optically scans the plurality of image carriers with each beam spot to form electrostatic latent images; a developing unit that visualizes each of the electrostatic latent images formed on the plurality of image carriers by the optical scanning device with toner of each color; a conveyor belt that is movably provided opposed to the plurality of image carriers and conveys a sheet-like recording medium; a transfer unit; and a fixing unit, wherein each of toner images of colors visualized on the plurality of image carriers is directly transferred to the recording medium conveyed by the conveyor belt using the transfer unit, the toner images of the colors are superimposed on one another on the recording medium, the toner images of the colors superimposed on the recording medium are fixed thereon by the fixing unit, to form a multi-color or color image, wherein the multi-color image forming apparatus further comprises a velocity detecting device, that detects velocity and velocity fluctuation of a moving member in an image forming unit in the image forming apparatus, wherein the velocity detecting device comprises:

an image-pattern acquiring unit that includes a laser light source and an area sensor that can acquire a one-dimensional or a two-dimensional image, provides a lens between the moving member and the area sensor, irradiates a beam emitted from the laser light source to the moving member to make a scattering light of the moving member scattered from the moving member, and acquires an image pattern on the area sensor derived from the scattering light by using the lens at a predetermined time interval in association with movement of the moving member; and a storage unit that previously stores therein image patterns corresponding to a plurality of positions on the moving member, wherein the moving member is an endless moving member, the velocity of the moving member is detected by computing the image pattern stored in the storage unit and the image pattern acquired by the image-pattern acquiring unit, and the image forming unit controls moving of the moving member based on the velocity of the moving member; and wherein the velocity detecting device detects velocity of the conveyor belt.

20. The multi-color image forming apparatus according to claim 18, further comprising at least one of a write-start-position correcting unit that corrects a write start position by the optical scanning device and a belt-velocity correcting unit that corrects velocity of the intermediate transfer belt or the conveyor belt.

* * * * *